US012359938B2

(12) United States Patent
Vitale et al.

(10) Patent No.: US 12,359,938 B2
(45) Date of Patent: Jul. 15, 2025

(54) COLLECTING USER-CONTRIBUTED DATA RELATING TO A NAVIGABLE NETWORK

(71) Applicant: TomTom Traffic B.V., Amsterdam (NL)

(72) Inventors: Vicenzo Vitale, Amsterdam (NL); David Silsbury, Amsterdam (NL); Zishan Ahmed Shaikh, Berlin (DE); Alessio Colombo, Berlin (DE); Simone Tornioli, Amsterdam (NL); Soren Sven Sonnenburg, Berlin (DE)

(73) Assignee: TomTom Traffic B.V., Amsterdam (NL)

( * ) Notice: Subject to any disclaimer, the term of this patent is extended or adjusted under 35 U.S.C. 154(b) by 513 days.

(21) Appl. No.: 17/623,845

(22) PCT Filed: Jul. 3, 2020

(86) PCT No.: PCT/EP2020/068908
§ 371 (c)(1),
(2) Date: Dec. 29, 2021

(87) PCT Pub. No.: WO2021/001565
PCT Pub. Date: Jan. 7, 2021

(65) Prior Publication Data

US 2022/0357181 A1 Nov. 10, 2022

(30) Foreign Application Priority Data

Jul. 3, 2019 (GB) ..................................... 1909556

(51) Int. Cl.
*G08G 1/04* (2006.01)
*G01C 21/00* (2006.01)
(Continued)

(52) U.S. Cl.
CPC ....... *G01C 21/3841* (2020.08); *G08G 1/0108* (2013.01); *G08G 1/04* (2013.01); *H04W 4/024* (2018.02)

(58) Field of Classification Search
CPC ............ G01C 21/3841; G01C 21/3848; G08G 1/0108; G08G 1/0112; G08G 1/04; H04W 4/024; H04W 4/02; H04W 4/021
(Continued)

(56) References Cited

U.S. PATENT DOCUMENTS 10,000,284 B1 * 6/2018 Purwin .................. B64U 10/30
10,964,215 B1 * 3/2021 Papineau ............... G08G 1/146
(Continued)

FOREIGN PATENT DOCUMENTS

CN 105580009 A 5/2016
CN 107155407 A 9/2017
(Continued)

OTHER PUBLICATIONS

Olivarez-Giles, Gogwalk pays iPhone users to do odd jobs, Technology and the Internet, May 5, 2011 (Year: 2011).*
(Continued)

*Primary Examiner* — Keith D Bloomquist
(74) *Attorney, Agent, or Firm* — Whitmyer IP Group LLC

(57) ABSTRACT

Disclosed herein is a technique for obtaining information relating to a navigable network from devices (12) that are associated with users travelling within the navigable network. For example, a central server can issue requests to the devices (12) for automatically obtaining sensor data, with a request including a set of instructions for obtaining sensor data from one or more sensor(s) (13) accessible by the device (12). The request also includes a location-specific trigger. Thus, when it is determined that the device (12) has reached the location associated with the trigger, the device is able to automatically action the instructions in order to obtain the requested sensor data, which can then be reported back to the server.

19 Claims, 4 Drawing Sheets

(51) Int. Cl.
*G08G 1/01* (2006.01)
*H04W 4/024* (2018.01)

(58) Field of Classification Search
USPC .......................................................... 701/450
See application file for complete search history.

(56) References Cited

U.S. PATENT DOCUMENTS 11,488,277 B2 * 11/2022 Djuric .................... G06Q 50/30
2007/0124064 A1 * 5/2007 Fukui ................ G01C 21/3859 701/532
2010/0332119 A1 12/2010 Geelen et al.
2011/0112751 A1 5/2011 Singh
2011/0224901 A1 9/2011 Aben et al.
2012/0176500 A1 * 7/2012 Muto ...................... H04N 7/18 348/148
2013/0018581 A1 1/2013 Sidhu et al.
2014/0136098 A1 5/2014 Stroila et al.
2015/0154867 A1 * 6/2015 Tseng ............... G08G 1/096766 340/905
2017/0017734 A1 1/2017 Groh et al.
2017/0061793 A1 3/2017 Witte et al.
2017/0161958 A1 * 6/2017 Eilat .................... G02B 27/017
2017/0254651 A1 * 9/2017 Resende ............ G01C 21/3837
2017/0332198 A1 11/2017 Gupta et al.
2018/0136002 A1 * 5/2018 Ishikawa ................. G06F 16/29
2018/0188045 A1 * 7/2018 Wheeler ................ G06V 10/98
2018/0213731 A1 * 8/2018 Wykman .............. A01D 34/008
2018/0224284 A1 * 8/2018 Danford ............... G09B 29/106
2018/0352376 A1 * 12/2018 Shuman .................. G06F 16/29
2018/0357907 A1 * 12/2018 Reiley .................... G08G 1/005
2019/0120964 A1 * 4/2019 Luo ....................... G01S 7/4817
2019/0236955 A1 * 8/2019 Hu ................... G08G 1/096741
2019/0266264 A1 * 8/2019 Michalakis .............. G07C 5/02
2019/0376809 A1 * 12/2019 Hanniel ............. G01C 21/3602
2020/0232804 A1 * 7/2020 Rogan ................ G01C 21/3602
2021/0201230 A1 * 7/2021 Duffy ................... G05D 1/0276

FOREIGN PATENT DOCUMENTS

EP 3029422 A1 6/2016
EP 3029421 A1 8/2016
WO 2010040390 A1 4/2010
WO 2018104563 A2 6/2018

OTHER PUBLICATIONS

International Search Report dated Aug. 31, 2020 for International patent application No. PCT/EP2020/068908.

* cited by examiner

COLLECTING USER-CONTRIBUTED DATA RELATING TO A NAVIGABLE NETWORK

FIELD OF THE INVENTION

The present invention relates generally to methods for obtaining information relating to a navigable network from devices (i.e. users) that are travelling within the navigable network. In other words, the present invention relates to 'crowd sourced' techniques for obtaining such information. In particular, embodiments of the present invention allow sensor data to be obtained automatically at various locations from user-devices that are travelling within the navigable network, preferably with minimal end-user involvement. The obtained sensor data can then be processed, e.g., to determine one or more attribute(s) of the navigable network. This information is preferably then reported to a map service provider, for instance, for updating an electronic map representation of the navigable network accordingly. However, various other applications would of course be possible and the obtained information may generally be used for any suitable and desired purpose.

BACKGROUND

Map data for electronic navigation devices including GPS based personal navigation devices such as dedicated navigation systems like the TomTom GO™ Sat Nav system, as well as navigation software running on a smartphone application, and also in-vehicle navigation systems, typically comes from specialist map service providers such as TomTom International BV. This electronic map data is specially designed to be used by route guidance algorithms, typically in combination with location data from the GPS module, in order to plan an optimal route for the navigation device to travel through a navigable network to a desired destination.

An electronic map is thus a digital representation of a real-world navigable (e.g. road) network. For example, road segments can be described as lines—i.e. vectors (e.g. start point, end point, direction for a road)—with a road then being made up of multiple of such segments, each uniquely defined, e.g., by its start point/end point/direction parameters.

An electronic map is then typically comprised of a set of such road segments, along with data associated with each segment (including 'attributes' for that segment such as a speed limit; travel direction, and so on), as well as any other points of interest (POIs), road names, other geographic features like park boundaries, river boundaries, etc., which may also desirably be defined within the map.

All of the features of the map (e.g. road segments, POIs, etc.) are preferably defined in a co-ordinate system that corresponds with or relates to the GPS co-ordinate system, enabling a device's location as determined through a GPS system to be mapped onto the corresponding road segment as defined in the map.

Navigation instructions for guiding a user along a predetermined route can thus be provided using such an electronic map by matching the (current) position of a device to the map, and then providing relevant navigation instructions as the device approaches various intersections, or other decision points, within the navigable network. For example, the navigation guidance may comprise an instruction that is generated for display to a user, such as an instruction to "Turn left at the next junction". However, it will be appreciated that navigation instructions may also be generated using the electronic map that are then provided, e.g., to an advanced driver assistance system (ADAS), or an autonomous driving module, and used thereby for navigating a vehicle around the network.

An important element for improving the user experience, and ensuring user safety, is that the navigation device when generating such navigation instructions does not cause a user/vehicle to perform an operation that is not in fact permitted (or not possible). Thus, it is important that the electronic map data is reliable and accurately reflects any, e.g., legal or physical driving restrictions within the network. For instance, navigation services usually aim to provide speed information for each road segment. In such cases, the map information comprises a maximum speed for a road segment which the navigation service may then display, or otherwise use, when generating navigation instructions. This functionality of course relies on the speed limit information provided with the electronic map being correct.

To construct an electronic map, basic road infrastructure information can be obtained from various sources, such as the Ordnance Survey at least for roads in the United Kingdom. Map service providers also typically have a large dedicated fleet of vehicles driving on roads that are arranged to obtain image and/or LIDAR data around the road network, as well as personnel checking other maps and aerial (satellite) photographs, to update and check the map data. This data constitutes the core of the map database and the map database is continuously being enhanced with new geo-referenced data.

Due to the constant changes to the road infrastructure, maintaining an accurate and current map database requires a continuous effort. Furthermore, as mentioned above, the navigation guidance preferably accounts not only for the basic road geometry, but also the current traffic regulations (e.g. speed limits), road closures, parking conditions, traffic delays, traffic density, points of interest, and so on, within the road network, which information is therefore usually provided alongside (or as part of) the electronic map data. This information typically changes more dynamically than the road infrastructure, and must therefore be continually updated or supplemented with live data in order to be able to provide reliable and up-to-date navigation guidance.

It is thus generally desirable to be able to obtain more information, and more frequently, in order to keep the electronic map up to date. Various approaches may be considered in this regard. For instance, the basic map data may also be supplemented by other data (which may include 'live' data) such as positional data obtained from navigation devices travelling within the network and relating to the movement of the devices around the network over time (i.e. probe data). This probe data can be processed to determine 'live' traffic conditions, and also to infer traffic regulations, road closures, and other such conditions, that persist at least semi-permanently within the network.

It is also known to obtain 'crowd sourced' (i.e. user provided) information for the purposes of updating an electronic map. For example, it is relatively common to allow end users of navigation services to signal that there is an error in the map or in the navigation instructions, e.g. by the user directly reporting such errors via a suitable web interface. Such user reports are then sent to the map service provider, who can then update the map information appropriately after checking and validating the user reports. Existing mapping systems can vary substantially in the extent in which user input is used and the extent of validation that takes place of user contributed data. Without validation, erroneous map updates result in map errors that require input from other users to either correct or undo an earlier update. EP2335021, EP3029421 and EP3029422 describe various other examples of navigation systems for issuing map update requests to a navigation device. Again, in these systems, user feedback is involved to determine whether there is a need for a map update.

Map data may also be obtained from reward platforms (such as Gigwalk, and similar) that incentivise users by offering some reward in exchange for obtaining some localised information, for instance by visiting a specific location to take photographs of that area. The reward platform requires users to download an application onto a mobile device such as a smartphone and the application then shows the user any available tasks, e.g. in the vicinity of the user. The application then guides the user through the steps required to obtain the required information (images, etc.) related to the task. For example, such reward platforms may be used to obtain information on off-street parking facilities which can then be incorporated into an electronic map for use by navigation services.

However, despite the considerable resources that go into updating and verifying these electronic maps, it is believed that there is still room for improvements in this regard. Thus, it is desired to provide improved methods for obtaining information relating to a navigable network.

SUMMARY OF INVENTION

According to a first aspect of the present invention there is provided a method for obtaining information relating to a navigable network from a device associated with a user travelling within the navigable network, the method comprising:

- receiving at the device a request for obtaining sensor data, wherein the request includes a set of one or more instruction(s) for obtaining sensor data from one or more sensor(s) accessible by the device, and a location-specific trigger, wherein the trigger is associated with a location within the navigable network; and
- when it is determined that the device has reached the location associated with the trigger, automatically actioning the instruction(s) in order to obtain the requested sensor data.

The present invention, in embodiments, thus provides a method for automatically obtaining information relating to a navigable network without requiring any substantial end-user interaction (other than possibly initially configuring the device/sensors, etc., to permit this functionality). This is achieved by issuing certain requests for sensor data (data acquisition requests') to devices (users) travelling within the navigable network. For instance, each data acquisition request contains a location (acting as a “trigger”) and a set of instructions (i.e. a script) detailing the sensor data that is to be obtained at the location specified in the request, as well as any other processing steps that the device may preferably be caused to perform.

Thus, a request for sensor data is issued to a device including a “trigger” that causes the device to automatically collect desired sensor data (as specified in the request) when the device passes a certain location within the network associated with the trigger, and to preferably then process the data to generate and return a suitable sensor data report. For instance, the trigger location may generally be defined relative to an electronic map representation of the navigable network, e.g. which electronic map is being used by a navigation application running on the device. The trigger location may effectively be superimposed onto the electronic map, and when it is determined based on the electronic map that the device has reached the trigger location, the device is then caused to automatically obtain the requested sensor data. The device preferably then provides the obtained sensor data (or more typically data indicative of the obtained sensor data) for output.

In this way, it is possible to remotely collect such information at any desired locations within the navigable network from the devices currently travelling within the network by issuing a request including a suitable trigger. It will be appreciated that the present invention thus facilitates an improved collection of such information relating to the navigable network as the information (i.e. sensor data) can be obtained without requiring a dedicated fleet of mapping vehicles, and also without requiring significant input from the device users (i.e. without requiring significant end user input).

For instance, the sensor data that is obtained in response to a particular trigger may be usable for determining one or more attribute(s) of the navigable network at the location associated with the trigger. That is, the sensor data, once obtained, may then be processed (preferably at least in part at the device, as will be explained further below) to determine one or more attribute(s) relating to the navigable network. The sensor data and/or determined attribute(s) may then be provided for output from the device accordingly.

For example, in some preferred embodiments, the request for sensor data is issued from a server, e.g. belonging to a map service provider, and the information is then returned to the map service provider, who can then update the electronic map based on the determined attribute(s) accordingly (preferably after validating any data that is received from the device, or devices, travelling within the network).

An example of this would be determining a speed limit on a particular road segment, e.g. by causing a camera associated with a device travelling on that road segment to capture an image of the speed limit sign (or a sequence of images, e.g. a video), which image(s) can then be processed to determine the speed limit value, with this value then being reported back and used for updating the electronic map accordingly, as required.

However, various other applications are contemplated and it will be appreciated that the present invention may generally be used for obtaining any suitable sensor data and/or determining any attributes of the navigable network, as desired, which can then be used for any desired purpose.

Thus, in embodiments, the device may be running a navigation application that is able to handle such requests for sensor data. In some preferred embodiments, the present invention may relate to a navigation application for obtaining sensor data by receiving a location trigger, processing the location trigger to extract a location and an action request, waiting for the device to reach the location, at the location processing the action request to obtain sensor data and after completing the action request sending the sensor data to a map information update system. However, other arrangements would of course be possible.

The present invention thus provides an improved technique for obtaining information relating to a navigable network requiring minimal end-user input, which information may then suitably be used, e.g., for updating an electronic map representing the navigable network (although other applications would of course be possible).

For instance, as users are increasingly relying on map information for navigation services (including route planning but also advanced/automated driving functionality), keeping the electronic map data accurate and up-to-date is of key importance for map service providers. Current approaches for updating/providing map information typically rely on a fleet of dedicated mapping vehicles which may be relatively costly, energy inefficient and can introduce substantial scheduling and processing delays.

It is also known to 'crowd source' map updates, but it will be appreciated that updating map information from crowd sourced inputs involves using potentially unreliable data; especially where user input is required. For instance, known techniques for crowd sourcing map updates typically require users to interact with a map system to provide feedback, to signal an update, or to provide details regarding a map update. Such user interaction may provide a barrier to user participation, and may also introduce errors.

By contrast, as explained above, the technology presented herein at least in its preferred embodiments allows information to be obtained from the end user devices (i.e. crowd sourced), on request, without involving significant end user input. That is, once the device and sensor(s) have been initially set up, and the relevant access permissions granted, and so on, if required, the sensor(s) associated with devices travelling within the network are then usable to obtain information at any desired location within the navigable network.

The desired information may thus be collected automatically (i.e. without end user intervention), on request from a server, essentially by allowing remote access to one or more sensor(s) associated with or accessible by the devices travelling within the navigable network. In particular, the sensor(s) may be controlled by issuing to the device(s) (e.g. from a central map service provider) a request for obtaining certain sensor data, which request may include a location-specific trigger to cause the sensor(s) to obtain data at a particular location within the network as defined by the trigger.

Also, at least in the preferred embodiments, as will be explained further below, the collection and reporting of such data preferably involves relatively lower processing and/or power bandwidth than some existing arrangements which typically use local storage for storing any sensor data to avoid draining the battery and/or data allowance of the devices that are used to obtain the data, such that at least in some embodiments the obtained sensor data can be provided for output and reported back substantially as it is obtained, i.e. on-the-fly, so long as there is an available communication link.

Although various embodiments described herein relate to obtaining information for use in updating an electronic map it will be appreciated that the present invention is not limited to this application, and the information that may be obtained according to embodiments of the present invention may find utility in a range of applications. For example, rather than being used directly for updating a map, the information may be used to focus mapping resource to a certain location. Similarly, the information regarding the network may be used for the purposes of highway maintenance, traffic management, etc., and is not limited for use for mapping purposes. Such information may also be of interest to automobile manufacturers, freight companies, and so on. In general, the information obtained regarding the navigable network may thus be used for any suitable application.

The present invention also extends to systems for performing the method of the first aspect. Preferably, the first aspect is performed on a device such as a navigation device which may comprise any of a dedicated portable navigation device (PND), an on-board computer, or even an application running on a smartphone or other portable electronic device (mobile device).

Thus, from a second aspect, there is provided a device that is operable to obtain information relating to a navigable network within which the device is travelling, and wherein the device has access to one or more associated sensor(s), wherein the device comprises one or more processor(s) arranged to:

- receive a request for obtaining sensor data, wherein the request includes a set of one or more instruction(s) for obtaining sensor data from one or more sensor(s) accessible by the device, and a location-specific trigger, wherein the trigger is associated with a location within the navigable network; and
- determine when the device has reached the location associated with the trigger, and in response to such determination automatically actioning the instruction(s) in order to obtain the requested sensor data.

This second aspect of the present invention can and preferably does include any one or more or all of the preferred and optional features of the invention described herein in respect of the first aspect in any of its embodiments, as appropriate. For example, even if not explicitly stated, the device may, and in embodiments does, comprise means for carrying out any step or steps described in relation to the method herein in any of its aspects or embodiments, and vice versa.

The steps of the first and second aspects are preferably carried out locally at the device, e.g. using one or more processor(s) and sensor(s) associated with the device. However, the device is preferably controlled to obtain sensor data through the use of requests (triggers) that are issued from a central server. It will be appreciated that as used herein a "server" may generally refer to a set of cluster of one or more server(s). In particular, it will be understood that a server need not be a (single) physical data server but may comprise a virtual server, e.g., running a cloud computing environment. Thus, the server may be a cloud server. Various other arrangements would of course be possible.

Thus, the device preferably receives the request for obtaining sensor data from a server, which request may then be actioned appropriately by the device. Once the device has obtained the requested sensor data, this data (or more typically information or other data obtained from the processing of this sensor data) can thus be reported back to the server.

Accordingly, from another aspect, there is provided a method for obtaining information relating to a navigable network from one or more device(s) each associated with a user travelling within the navigable network, the method comprising:

- issuing from a server to one or more device(s) travelling within the navigable network a request for obtaining sensor data, wherein the request includes a set of one or more instruction(s) for obtaining sensor data from one or more sensor(s) accessible by the device(s), and a location-specific trigger, wherein the trigger is associated with a location within the navigable network, wherein the trigger is arranged to cause the device to automatically action the instruction(s) to obtain the sensor data when it is determined that the device has reached the location associated with the trigger; and
- receiving at the server data that is indicative of the sensor data obtained from one or more of the device(s) in response to the request for sensor data.

From a further aspect, there is provided a server arranged for obtaining information relating to a navigable network from one or more device(s) each associated with a user travelling within the navigable network, the server comprising one or more processor(s) arranged to:

issue to one or more device(s) travelling within the navigable network a request for obtaining sensor data, wherein the request includes a set of one or more instruction(s) for obtaining sensor data from one or more sensor(s) associated with or accessible by the device(s), wherein the trigger is arranged to cause the device to automatically action the instruction(s) to obtain the sensor data when it is determined that the device has reached the location associated with the trigger; and receive data that is indicative of the sensor data obtained from one or more of the device(s) in response to the request for sensor data.

It will be appreciated that the present invention also extends to an overall system and method for collecting such information. For instance, the steps that are preferably performed by the server according to these further aspects are preferably used in combination with the steps preferably performed by the device according to the first and second aspects, and in embodiments there is thus provided a system including such server and device communicating via a suitable wireless communication network.

Thus, from another aspect there is provided a method for obtaining information relating to a navigable network from one or more device(s) each associated with a user travelling within the navigable network, the method comprising:

issuing from a server to one or more device(s) travelling within the navigable network a request for obtaining sensor data, wherein the request includes a set of one or more instruction(s) for obtaining sensor data from one or more sensor(s) accessible by the device, and a location-specific trigger, wherein the trigger is associated with a location within the navigable network;

receiving at a device travelling within the navigable network the request for obtaining sensor data;

when it is determined that the device has reached the location associated with the trigger, automatically actioning the instruction(s) in order to obtain the requested sensor data; and providing data indicative of the obtained sensor data for output to the server.

Correspondingly, from yet another aspect there is provided a system for obtaining information relating to a navigable network from one or more devices(s) each associated with a device travelling within the navigable network, the system comprising a server and one or more device(s), wherein the server is arranged to issue to one or more of the device(s) travelling within the navigable network a request for obtaining sensor data, wherein the request includes a set of one or more instruction(s) for obtaining sensor data from one or more sensor(s) accessible by the device, and a location-specific trigger, wherein the trigger is associated with a location within the navigable network;

wherein the device is arranged, after receiving the request, to determine when the device has reached the location associated with the trigger, and in response to such determination to automatically action the instruction(s) in order to obtain the requested sensor data, and to provide data indicative of the obtained sensor data for output to the server.

Again, it will be appreciated that the method and system of these further aspects may generally comprise, and preferably do comprise, a device and server as described in relation to the earlier aspects and embodiments, as appropriate, and may thus comprise any combination of optional/preferred features of those aspects.

The means for carrying out any of the steps described in relation to the method or apparatus according to the present invention in any of its aspects or embodiments may comprise a set of one or more processor(s) and/or suitable processing circuits or circuitry. The present invention is therefore preferably a computer implemented invention, and any of the steps described in relation to any of the aspects or embodiments of the invention may be carried out under the control of a set of one or more processor(s) and/or suitable processing circuits/circuitry. The processing circuits/circuitry may generally be implemented either in hardware or software, as desired. For instance, and without limitation, the means or processing circuits/circuitry for carrying out any of the steps described herein in relation to the method or system of the present invention may comprise one or more suitable processor or processors, controller or controllers, functional units, circuits/circuitry, processing logic, microprocessor arrangements, etc., that are operable to perform the various steps or functions, etc., such as appropriately dedicated hardware elements (processing circuits/circuitry) and/or programmable hardware elements (processing circuits/circuitry) that can be programmed to operate in the desired manner.

The present invention may be implemented in relation to navigable elements of any type. Preferably the navigable elements are road elements (of a road network), but it will be appreciated that the techniques are applicable to any type of road element, or indeed other type of navigable element, for which it is desired to obtain information (e.g. attributes). Thus, while exemplary embodiments refer to road elements of a road network, it will be appreciated that the technology presented herein is more generally applicable to any form of navigable element, including elements of a path, river, canal, cycle path, tow path, railway line, or the like.

The navigable network may be represented by an electronic map, e.g. in a manner that is generally known in the art. The electronic map is thus a digital representation of the real world navigable network. The electronic map may thus represent the arrangement of navigable elements (e.g. roads) within the network. Furthermore the electronic map may also (and typically does) include certain attributes associated with the navigable elements (e.g. speed limits, travel directions). The electronic map may also define any other features such as points of interest (POIs), etc., that may desirably be represented in the map. The use and generation of such maps, e.g. for navigation purposes is generally well understood. Electronic maps are normally maintained (updated) and provided to users by map service providers, such as TomTom International BV.

The device(s) are typically associated with a user (and may thus be referred to as "user devices"). That is, the devices are preferably associated with existing users of the navigable network, who may (e.g.) by using a navigation application which controls the collection of such information. In other words, the devices are preferably associated with existing users of the navigable network as opposed to a dedicated fleet of mapping vehicles that are specifically used for collecting such information.

Preferably the (or each) device is also associated with a vehicle. References to data such as sensor data obtained from a device, may in such embodiments thus be replaced by a reference to data obtained from a vehicle, and references to the movement of a device or devices may be replaced by a reference to the movement of a vehicle, and so on, even if not explicitly mentioned. The device may be integrated with the vehicle, or may be a separate device that is otherwise associated with the vehicle such as a portable navigation apparatus or a smartphone or other mobile device that is, e.g., mounted on or carried within the vehicle.

However, this need not be the case, and the device may be carried by a pedestrian, and used to obtain information about the network that is navigable by foot. Other arrangements would of course be possible.

Of course, the sensor data may be obtained from a combination of different devices, or a single type of device.

The (or each) device also has access to one or more sensor(s). The sensor(s) may be associated with, and hence accessible by, the device in any suitable manner, depending e.g. on the nature of the device and sensor. For instance, a sensor may be a sensor of the device, in which case the device is able to directly access and control the sensor to obtain the desired sensor data. Thus, (at least some of) the sensor(s) may be incorporated into the device, such that the device comprises such sensor(s). For example, in embodiments, the device may comprise a smartphone or other such mobile device, and the sensor(s) may include the camera, GPS module, accelerometer, etc., of the device. However, it also contemplated that the device may merely have access to the sensor(s) by being in communication therewith, e.g. via a suitable wireless (e.g. Bluetooth) connection. In that case, the sensor(s) may be sensors provided as part of another device (within the same vehicle) that forms part of an interconnected wireless communication network with the device that is handling the request. For instance, in embodiments, the device may comprise an on-board navigation system, in which case the device may have access to the vehicle's sensors.

Various other arrangements would of course be possible including combinations of the two examples presented above, e.g. wherein a smartphone or other mobile device also has access to the vehicle's on-board sensors. For example, and in general, the device and the sensors may comprise part of an interconnected wireless network, e.g. within an 'internet of things' type environment. A device may therefore (and preferably does) have access to a plurality of sensors, preferably of different types. Preferably the device and sensor(s) are associated with the same vehicle, or user.

The sensor(s) may be any suitable type. This may include, without limitation, cameras, accelerometers, orientation detectors, odometers, microphones, etc., or indeed any other type of sensor that might typically be accessible by a device.

For instance, it will be appreciated that cars and other vehicles are increasingly equipped with on-board cameras, and other sensors (e.g. range detection sensors). Some high-end vehicles already use these cameras to constantly search for road signs (i.e. 'traffic sign recognition). After detecting a road sign, an on-board processer then processes the images and determines the speed limit on the road segment that the vehicle is travelling on. This functionality is normally referred to as 'Speed Limit Assist'. Similar techniques can also be used for localising a vehicle relative to a map. For example, WO 2018/104563 describes a method wherein image data obtained from one or more cameras associated with a vehicle travelling within a road network is obtained, and then used to generate a local map representation which can be compared with a section of a reference map in order to localise the vehicle. Such techniques can also be extended such that in the event that an 'error' (such as an incorrectly mapped, or missing, feature) is identified in the reference map, this information can be relayed to a map service provider and used for updating the electronic map. This means that the in-car system may be able to detect inconsistencies between the obtained sensor data and the electronic map used for reference, and thus send the obtained sensor data to the map service provider for updating the map.

Similarly, mobile navigation devices or navigation applications on mobile devices increasingly have access to camera and other sensors (accelerometers, microphones, orientation detectors), which may also be used as a source of such information. The software systems in a vehicle increasingly provide information exchange with mobile devices such as mobile phones, tablets, smart watches and so on. The connectivity relies on wireless networks within the car and networks for mobile devices, within a so-called Internet of things' environment.

The present invention thus allows these existing sensors to be controlled remotely in order to obtain desired sensor data on request, e.g. from a map service provider, without requiring significant user interaction.

The sensor data, once obtained, is preferably then processed in order to determine one or more attribute(s) of the navigable network. The sensor data may thus comprise any suitable data that may desirably be used in order to determine any attributes of the navigable network. The processing required will of course depend on the nature of the sensor data. For instance, in embodiments, the sensor data may comprise image data obtained from one or more camera(s) associated with the device. An example of this might be an image of a speed limit sign that is then processed in order to extract the speed limit value for that road segment. In that case, suitable image processing software may be used to extract such information. However, various other image data may be obtained for a variety of applications including, but not limited to, assessing current traffic conditions within the network.

When the sensor data comprises image data, any suitable image processing techniques may be used for processing the image data to determine the desired attributes, e.g. depending on the nature of the image and the attribute(s) that are to be determined. For instance, the image processing may generally be performed using a suitable classification algorithm (a 'classifier') which may, e.g., comprise a neural network or other suitably trained algorithm that has been trained based on prior image data to be able to extract the desired features. For example, a classifier (e.g. neural network) may be provided that has been trained to identify speed limit values based on training data comprising a set of images including traffic limit signs. The classifier can then be run, preferably on the device, in order to process the obtained image data and extract speed limit information.

However the sensor data need not comprise image data. For example, in another embodiment, the sensor data may comprise acceleration data obtained from one or more accelerometer(s) associated with a device. The acceleration data may then be processed to determine, e.g., a condition of the road element, e.g., to identify potholes, speed bumps, and so on. Another example would be ambient noise data, e.g. obtained from a microphone. Various other arrangements would be of course be possible.

The attributes that are determined may thus comprise any suitable information that might preferably be incorporated into or alongside the electronic map. The attributes may be semi-permanent features of the road network, such as speed limits, and so on, which are typically changed only relatively infrequently (e.g. weeks, months, or even years), or may reflect more dynamic conditions of the network such as current traffic conditions. The attributes may generally be time dependent. For instance, the sensor data may be provided for output along with a time stamp that can then be used to determine temporal variations in the network. For example, speed limits and driving restrictions may be in place only at certain times of the day (e.g. a driving restriction may be in place only at weekends, or only during rush hour, etc.). This time behaviour can then be captured and preferably incorporated into the electronic map. Similarly, where the attributes relate to the dynamic or 'live' conditions within the network, the data may be discarded, or given less weighting, after a certain period of time has passed (e.g. as it may no longer reflect the current conditions and should therefore be replaced with new data, where available).

Preferably at least some of this processing of the obtained sensor data is performed on the device, e.g. to avoid having to transmit useless or redundant information to the server (thus saving bandwidth). However, other arrangements would of course be possible. For instance, it is also contemplated that the processing may be performed solely on the server. In that case, the obtained sensor data may be provided for output and transmitted essentially in its raw format (although preferably the device at least performs a data compression step to reduce the size of the data packet that is to be transmitted). The data that is received by the server may then be suitably processed at the server in order to determine the desired attribute(s). When the processing is performed at the server, this may be done using a suitable algorithm run on the server, or even by manual processing.

However, as indicated above, preferably at least some of the processing of the sensor data is performed at the device. Thus, preferably, rather than providing the obtained sensor data for output in its raw format, the device first processes the obtained sensor data to generate a sensor data report that can then be transmitted to the server. Thus, in embodiments, the step of providing data indicative of the obtained sensor data for output comprises processing the obtained sensor data to generate a sensor data report and providing such sensor data report for output.

For example, in preferred embodiments, the device processes the obtained sensor data to determine or extract information relating to one or more attribute(s) of the navigable network, e.g. in the manner described above. In this way, the amount of data that is required to be transmitted from the device can be further reduced, since it is only necessary to transmit data indicative of the value of the determined attribute (e.g. a speed limit value) rather than the raw sensor data (e.g. an image or image sequence). Furthermore, processing the obtained sensor data at the device allows the device to discard (and therefore not report) any data that is irrelevant or redundant. Again, this means that such data need not be transmitted back to the server, again potentially reducing bandwidth requirements.

In other words, the device may locally process the sensor data in order to increase the reliability and information density of the information that is transmitted to the map service provider. The local processing may be controlled through a suitable script (i.e. set of instructions) that is preferably also included in the request for obtaining sensor data. That is, the local processing of the obtained sensor data may be performed under the instruction of the server, with the instructions being included within the request. That is, the device is preferably caused to automatically obtain and process the requested sensor data upon reaching the trigger location.

As well as the determined attribute(s) and/or information obtained from the processing of the sensor data, the sensor data report may typically include other information preferably including one or more of: (i) a time at which the sensor data was obtained; (ii) the location at which the sensor data was obtained; and (iii) a device and/or sensor identifier. The data indicative of the obtained sensor data (e.g. the sensor data report) is preferably also tagged or otherwise encoded such that the server is able to associate the received data with the request (trigger) that caused that data to be obtained. That is, the sensor data report preferably also includes a 'request identifier' to allow the server to associate the sensor data report with the respective request that generated the data. Thus, the sensor data report preferably also includes a request identifier indicating the request that generated the sensor data report. The server is thereby able to correlate the received data with the requests (triggers) that have been issued.

Thus, the server preferably receives from the device a sensor data report that includes not only the data indicative of the obtained sensor data (which preferably comprises one or more attributes determined from processing the sensor data, such that the sensor data itself need not be transmitted from the device), but also any other desired information regarding the sensor data, or the device that has provided the sensor data. Preferably the server receives a plurality of such sensor data reports from a plurality of different devices travelling within the navigable network. The received sensor data report(s) can then be processed appropriately by the server in order to extract the desired information (e.g. attribute(s)) relating to the navigable network.

In some preferred embodiments the device output (e.g. the determined attribute(s) and/or sensor data) is provided to a map service provider, and used thereby for updating an electronic map. The map service provider is thus able to use the collected information to update the electronic map, with a suitable map update then being released periodically, or more dynamically (e.g. substantially in real-time), e.g. depending on the nature of the information.

Preferably, the obtained sensor data, or at least data indicative thereof, is provided directly to the server as and when it is obtained. For example, so long as there is a suitably available data connection, the obtained sensor data may be transmitted to the server (or servers, e.g. where the map update service is based on a cloud server) substantially on-the-fly. However, it is also contemplated in less preferred embodiments that the data collected by the device may be stored on the device until such time when it is desired to transmit the data to the map update service. The data is preferably transmitted to the server using a wireless communication network providing internet access (such as GSM 1G-4G, 5G, Narrowband-IoT, LoRa, etc.). Various arrangements would of course be possible in this regard.

It will be appreciated that the data obtained from the devices may potentially be unreliable, for example, if there is a fault with the sensor, or the sensor is incorrectly mounted, or also if there is a fault in the device's position-determining functionality. Accordingly, before this information is used, the data received from the device(s) is preferably validated at the server, e.g. to ensure the quality and content of the data. Various approaches for validating the obtained data are contemplated.

For example, preferably the obtained sensor data is validated by combining and/or comparing sensor data that has been obtained from a plurality of different devices (either at substantially the same time, e.g. within a certain time window; or by comparing data with historic sensor data). Thus, in embodiments, processing the data that is received at the server includes a step of validating the obtained sensor data, wherein validating the obtained sensor data comprises combining and/or comparing sensor data that has been obtained from a plurality of different devices. The validation of the received data may also check the authentication and confidentiality credentials associated with the data, which information may also be defined within the sensor data report.

According to the present invention the sensor data is obtained remotely from the devices (and their associated sensor(s)) with the obtaining of the sensor data being controlled using one or more location-specific "triggers" that can be issued from the server to the device as part of a request for obtaining sensor data.

The server may issue a request for sensor data itself, e.g. when it is determined at the server side that some information is required. For example, where the map service provider wants to obtain information at a certain location, the map service provider may then issue via the server a request for sensor data at that location to one or more (and potentially all available) device(s) currently travelling within the navigable network. However, other arrangements would of course be possible.

Thus, in embodiments, the requests for sensor data may be issued to a device along with the electronic map and associated data. In that case, the triggers may be effectively added onto the electronic map, e.g. in an analogous manner to a point of interest, or other feature that may be superposed into the electronic map. As a device using the electronic map travels around the navigable network, the requested sensor data may then be obtained automatically and reported back to the server whenever the device reaches (or passes) a trigger. That is, when it is determined that a device has reached a trigger, the device is then caused to automatically obtain the requested sensor data.

A request for sensor data thus contains a location (acting as a "trigger") and a set of instructions (e.g. a script) detailing the sensor data that is to be obtained, and preferably the steps that the device should perform to obtain the sensor data. Thus, when the device determines that it has reached the location specified by the trigger, the device can then automatically cause the sensor(s) to start acquiring data at that location by performing the operations specified in the instructions.

The set of instructions may thus comprise a "WAIT" instruction that causes the device to wait until the specified location before moving to the next instruction (e.g. which may be an instruction to start acquiring sensor data). Alternatively, the script may be loaded only once it is determined that the specified location has been reached. Various other arrangements would of course be possible.

The instructions also include instructions for activating the sensor(s) to obtain the requested data, and controlling the sensor operation. For example, when the sensor is a camera, the instructions may include instructions to obtain a sequence of images at certain intervals (in time/space) along a particular road segment. Similarly, the instructions may be to obtain a video sequence for a certain duration along the road segment. An example of this would be when determining speed limit information, as described above. In that case, the server issuing the request may not know the precise location of the speed limit sign, but knows that it will be located at some point along the road segment. A request may thus be issued to cause a device arriving at the start of the road segment to capture image/video data for substantially the whole road segment (or at least until the speed limit sign has been detected). This image sequence is preferably then processed at the device to extract the speed limit value which can then be reported back (preferably without reporting back the entire image sequence, thereby saving bandwidth).

As well as the instruction(s) for activating the sensor(s) to obtain the data, the set of instructions may also include any other desired instructions, e.g. for pre-configuring the device and/or sensors and/or for processing the obtained sensor data. For instance, the instructions may also include instructions for the device to generate a sensor data report for output, as discussed above.

Thus, the instructions may detail the type of sensor(s) that are to be used for completing the data acquisition request; the desired orientation of the sensor(s) (for example, if it is determined that the sensor(s) are mounted incorrectly, the script may abort at that point without obtaining sensor data); a duration for data collection; any repeated collection steps; and/or any further processing steps that should be performed when obtaining the sensor data and preparing this for output.

All of these instructions can be (and preferably are) included within the request and thus any end-user involvement in processing the request can be essentially eliminated.

The request for sensor data is thus a data package that includes a location-specific trigger to cause sensor data to be obtained at the specified location (which may, e.g., be defined relative to the electronic map) as well as instructions for obtaining the sensor data, and also, e.g., for obtaining the sensor data, processing (or pre-processing) the obtained sensor data, and for generating a suitable sensor data report including data indicative of the obtained sensor data, along with any other desired attributes. A device upon receipt of such a request is thus able to unpack the package (request) in order to extract the location-specific trigger, and to read any instructions, etc., required for obtaining and/or processing the sensor data.

In some embodiments, the server may automatically issue requests for sensor data including such triggers when it is determined that something has changed within the navigable network relative to the current version of the electronic map. For example, in embodiments, a map update system is provided that is arranged to detect a location where the observed behaviour of devices within the navigable network does not match the expected behaviour based on the electronic map, and to then automatically issue a request including a trigger for sensor data at that location. In embodiments, the system may be arranged to obtain positional data relating to the movement of one or more device(s) over time with respect to the electronic map, and to process the obtained positional data to identify instances wherein the observed behaviour does not match an expected behaviour based on the current version of the electronic map. When such instances are identified, a request may then be generated including a suitable trigger for obtaining sensor data to try to resolve the apparent inconsistency. Thus, in embodiments, the requests (triggers) may be generated by a map service provider (and then issued to a plurality of devices accordingly).

Alternatively, the triggers may be requested from the device. For example, after the device has determined a route that is to be followed (e.g. using known route planning algorithms as are typically found in navigation devices/software), the device may then request from the server any triggers that are located along that route. Requests for sensor data including such triggers can then be issued, with the triggers being added to the route at the associated locations. That is, rather than the server pushing the requests (triggers) to the device, the device (client) may pull the triggers.

The trigger thus causes the device to obtain sensor data when it is determined that the device has reached the location associated with the trigger. The techniques described herein may thus comprise a step of determining when the device has reached the location specified by the trigger. This determination may be performed in various ways. For example, it will be appreciated that the device is generally capable of determining its own location (e.g. using GPS, or other similar position-determining capability as is known in the art), and the device is therefore able to determine when it is approaching a trigger location. Thus, in preferred embodiments, the determination of when the device has reached the location specified by the trigger is made by the device, e.g. by a suitable positioning module associated with the device. Preferably, this determination is made relative to an electronic map representation of the navigable network. For instance, the position of the device may be matched onto the map (e.g. using known map-matching techniques) in order to compare the position of the device with the trigger location which is preferably also defined (mapped) into the electronic map. However, other arrangements would be possible.

The determination of when the device has reached the location specified by the trigger may be made when it is determined that the device is within a predefined threshold distance of the location trigger (at which point the sensor(s) may be activated and caused to start obtaining data, etc., in the manner described above). The threshold distance may be 'zero', i.e. such that the data is obtained as the device passes the trigger location. In some cases the trigger may also include a direction indication such that sensor data is only obtained when it is determined that the device is approaching the location associated with the trigger from a selected direction. Various other arrangements would of course be possible in this regard.

Thus, it will be appreciated that the requested sensor data may be obtained, and reported back to the server, automatically, i.e. without any end-user interaction (save for initially configuring the device to permit this functionality, and allow access to the sensor(s), etc.). The present invention, at least in its preferred embodiments, thus enables a crowd sourced update loop that requires minimal user interaction. For example, the technology presented herein may be used to provide a high-quality electronic map containing more up-to-date speed limit information. However, the present invention is of course not limited to determining speed limits. For instance, the present invention may also support crowd sourced map updates for various static and dynamic map attributes including, but not limited to: speed limits, traffic lights, number of lanes, speed cameras, new roads, turn restrictions, roadworks, closed roads, type of road marking (e.g. a dashed line indicating that overtaking is allowed, etc.), POI confirmation, and so on.

In some preferred embodiments the technology is implemented on mobile platforms, e.g. where a mobile device such as a smartphone is mounted within a vehicle. However, the present invention may generally be implemented using any suitable device and sensors, which may be associated with a mobile device, or may be on-board sensors, or some combination.

In its preferred embodiments the present invention thus enables a map content provider to send data collection requests to a navigation application executing in a vehicle and connected via the in-vehicle network to a set of computing devices and associated sensors. As there is no user involvement (other than the initial set-up to configure access rights), the system is effortless for the user, provides more reliable information and enables a much faster feedback loop for updating the map information.

It will be appreciated that the methods in accordance with the present invention, in any of its aspects or embodiments, may be implemented at least partially using software. It will thus be seen that, when viewed from further aspects and in further embodiments, the present invention extends to a computer program product comprising computer readable instructions adapted to carry out any or all of the method described herein when executed on suitable data processing means (a data processor). The invention also extends to a computer software carrier comprising such software. Such a software carrier could be a physical (or non-transitory) storage medium or could be a signal such as an electronic signal over wires, an optical signal or a radio signal such as to a satellite or the like.

It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processor. The data processor may be a microprocessor system, a programmable FPGA (field programmable gate array), etc.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

The present invention in accordance with any of its further aspects or embodiments may include any of the features described in reference to other aspects or embodiments of the invention to the extent it is not mutually inconsistent therewith.

It should be noted that references to a location of, etc., the device, or a location within the navigable network/map, etc., herein should be understood to refer to data indicative of these unless the context demands otherwise. The data may be in any way indicative of the relevant parameter, and may be directly or indirectly indicative thereof. Thus any reference to a location, an attribute, etc., may be replaced by a reference to data indicative thereof, i.e. location data, or attribute data, etc. It should also be noted that the phrase "associated therewith" should not be interpreted to require any particular restriction on data storage locations. The phrase only requires that the features are identifiably related.

Various features of embodiments of the invention will be described in further detail below.

BRIEF DESCRIPTION OF DRAWINGS

Various aspects of the teachings of the present invention, and arrangements embodying those teachings, will hereafter be described by way of illustrative example with reference to the accompanying drawings, in which.

DETAILED DESCRIPTION

Embodiments of the present invention relate to methods of collecting information about a navigable network (e.g. map information) from user devices currently travelling within the network. In other words, embodiments relate to techniques for 'crowd sourcing' such information. Preferably the navigable network is a road network and the information is collected from devices that are associated with vehicles travelling within the network. For example, information may be collected from user devices such as smartphones that are carried, or mounted, within a vehicle and/or from in-vehicle systems.

Figure 1:
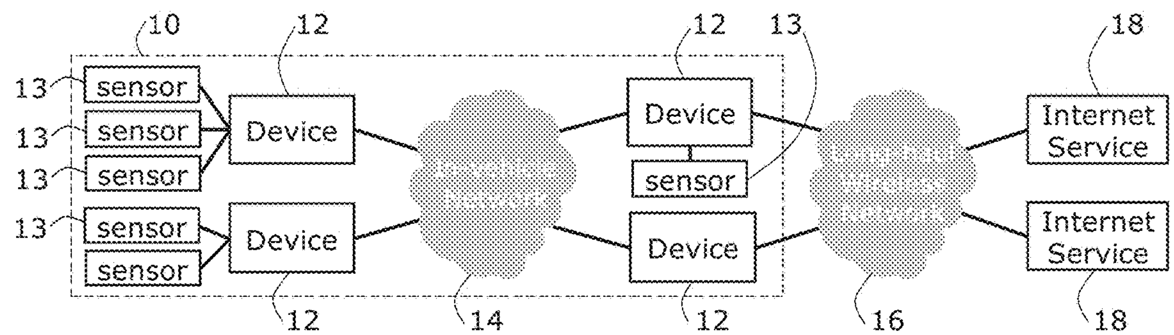
FIG. 1 shows schematically a system within which embodiments of the technology presented herein may be implemented.

FIG. 1 illustrates an example of a system within which embodiments of the present invention may be performed. As shown, a vehicle 10 includes an interconnected set of devices 12 that are able to communicate with each other through an in-vehicle network 14. Some of the devices 12 are also connected to a long-haul wireless network 16 (such as a cellular phone network, GSM G1-G4, G5, Narrowband-IoT, LoRa, etc.) which provides access to one or more internet service(s), e.g. via a server 18.

FIG. 1 shows several devices 12 attached to the in-vehicle network. Each device 12 typically contains a processor, some memory and a network interface. At least some of the devices 12 are also equipped with one or more sensors 13, e.g. a microphone, a camera, an accelerometer, a positioning sensor, a proximity sensor, a radar, a laser range finder, an ambient light detector, and so on. Some of the devices 12 may be embedded into the vehicle, such that their sensor(s) 13 have a fixed orientation. However, some of the devices 12 may belong to a user, such as a user's smartphone, and may thus need to be mounted in place before they can be reliably used.

Any devices 12 connected to the in-vehicle network 14 may be configured to share their resources (e.g. sensors 13) with other devices 12 in the network 14. For example, a mobile device may be enabled to access video sensors embedded in devices embedded into the vehicle. Similarly, an application running in an embedded device may be enabled to access to the long-haul wireless network of a mobile device. The devices 12 may thus communicate within an Internet of things' type infrastructure that allows them to share resources.

At least one of the devices 12 may be running a navigation application. In a manner that is generally known, the navigation application may assist the user in navigating to a new destination, or it may merely provide relevant information for navigating to a commonly used destination (home, work, etc.). In both modes, the navigation application may use locally stored map information and receive map information from a map content provider using the long-haul wireless network 16.

The map content provider provides a wide range of map information. It will be appreciated that the map information related to road network is relatively static and map updates can be scheduled well in advance as roadworks may take months to years to complete. However, other map information such as traffic densities, accidents, road closures, updated road signs, points of interest, and so on, may be more dynamic. The map content provider can observe location data points from navigation applications to detect differences between historic navigation data and recent navigation data. Such differences may point to a change in map information. This and other types of reports are handled by a map update system.

Location Trigger Processing

Embodiments enable a map update system to rapidly obtain local information supporting a map update decision. It involves a navigation application within the in-vehicle network 14 to be able to support processing of a location trigger as shown in FIG. 2.

Figure 2:
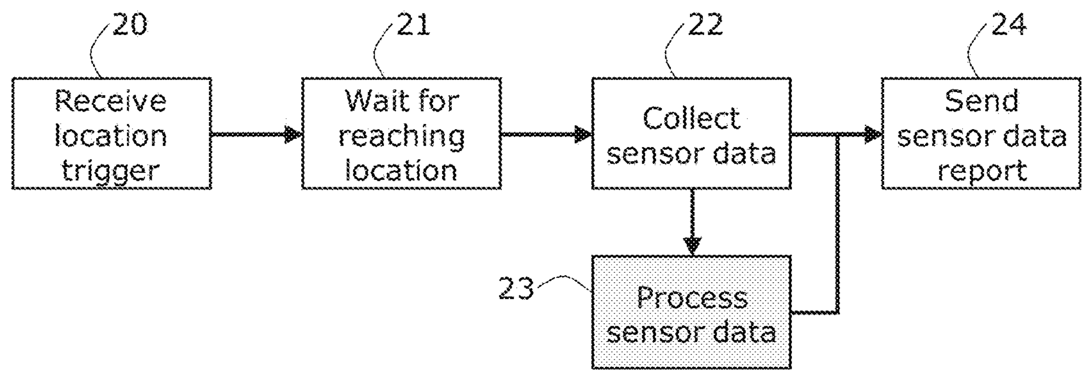
FIG. 2 shows the processing steps performed by a device when receiving a location trigger in accordance with an embodiment.

FIG. 2 shows the processing steps of a navigation application starting with receiving a location trigger (step 20) comprising a location point and an action request. A location point is the specification of a point on a map for example expressed using a longitude and latitude value pair. The location point usually is located on a road segment or on a new road segment. The location point also may contain a direction indication. The action request describes a data collection request for map making purposes at the associated location point. The action request may prescribe taking one or more images by an accessible camera or record a short video sequence. The action request also may prescribe recording accelerometer readouts over a time segment. Hence any sensor accessible to the navigation application may be included in the action request. After receiving the action request, the navigation application waits for the vehicle location data to indicate that is within a certain margin of the location point provided in the location trigger (step 21).

At the location trigger point, the navigation application collects the sensor data (step 22) either from a local sensor or from an accessible sensor of another device in the in-vehicle network as indicated in the action request. Optionally, the navigation application may process the collected sensor data (step 23). The processing may use code (a script, a set of byte codes, binary code) contained in the location trigger message or use predetermined sensor data processing functions supported by the navigation application.

An example of the sensor data processing is a search for features in an image or a data compression operation. The processing may reduce the size of the sensor data by detecting and removing redundant or irrelevant information. The processing step also may combine the collected sensor data with other sensor information such as time, date, location, device identification, sensor identification and so on into a sensor data report. The sensor data report preferably uses authentication and confidentiality techniques. The sensor data report is sent as a response to the received location trigger (step 24).

On the other hand, if the vehicle location data do not reach the location point within the predetermined margin the navigation application returns an error message after expiry of a time-out window.

Map Update System

Figure 3:
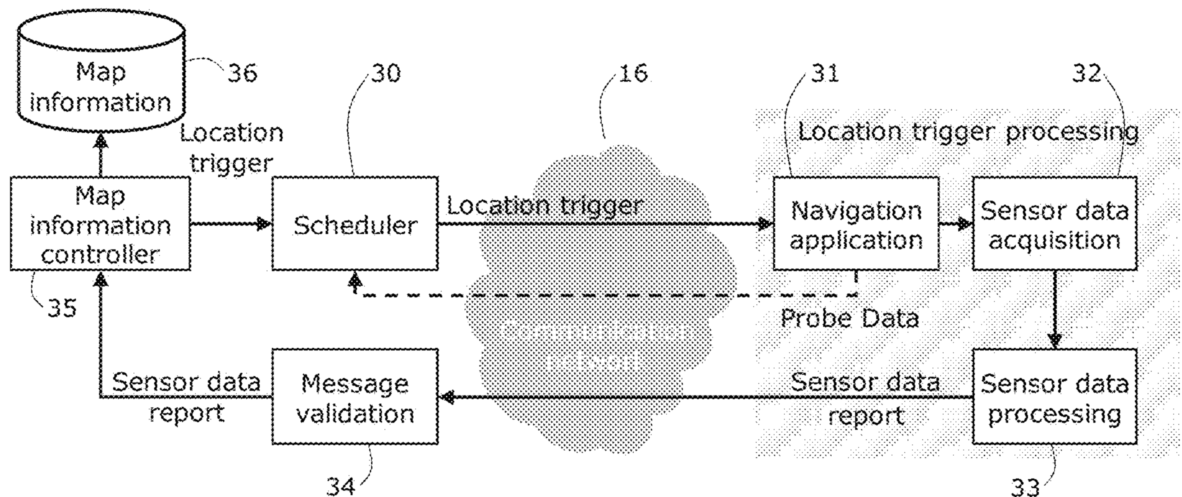
FIG. 3 is a high-level architecture diagram of a map information update system according to an embodiment.

The features embodied in the navigation application as described above may beneficially be used in a map information update system. FIG. 3 contains a high-level architecture diagram of a map information update system according to an embodiment.

FIG. 3 thus shows a map information update system with a map information controller 35 for generating location trigger messages. If the location point of a location trigger is within a certain range of a road segment, a reference or a location trigger identifier is added to the road segment associating the road segment with the location trigger. It will be appreciated that such an association may therefore resemble a Point of Interest (POI), or a road segment attribute, within the electronic map. The location triggers are then issued to a navigation application 31 associated with a vehicle travelling within the network via a scheduler 30. Optionally, the scheduler 30 may also collect positional data from the navigation application 31 and then determine based on the probe data which navigation application(s) 31 to issue the location trigger to. For example, the scheduler 30 may selectively issue location triggers only to navigation applications 31 that are in the vicinity of the associated location. Alternatively, the scheduler 30 may issue location triggers to all navigation applications 31 that are currently operating within the road network.

Figure 4:
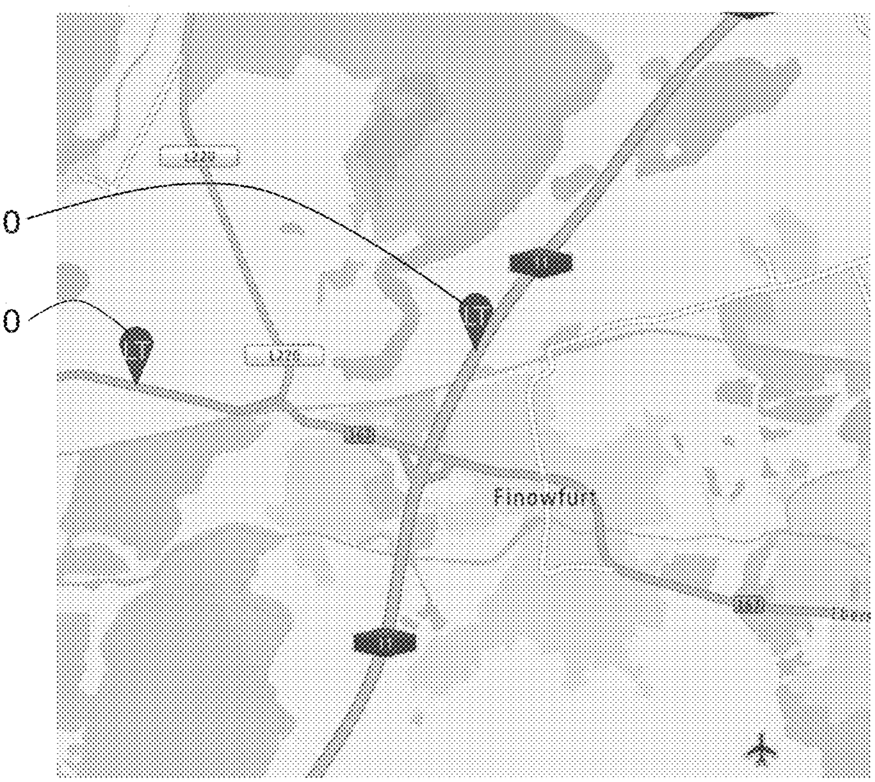
FIG. 4 represents how location triggers may be incorporated onto an electronic map representation of a road network.

For instance, the navigation application 31 may receive the association information as part of the map data. This is illustrated in FIG. 4 which shows two location triggers 40 superimposed onto an electronic map representation of a road network. Alternatively, the navigation application 31 may request any such associations near a present location, near a planned route, or near a frequently travelled route. For example, the navigation application 31 may use the association information (a reference, an identifier) to request the transmission of the location trigger.

Each of the implementations described above results in the transmission of the location trigger via the long-haul communication network 16. The navigation application 31 receiving the location trigger may then collect the requested sensor data from an associated sensor 32 within the in-vehicle network 14 and then process the location trigger using suitable sensor data processing software 33 as described in the previous section to generate and return a sensor data report.

The map information controller 35 may then use the sensor data report to update the map information 36 appropriately. At this stage, the update process may generally be comparable to known map update mechanisms or map creation mechanisms.

As the sensor data report can be regarded as untrusted user data, the map information update system may adopt a message validation module 34 to verify the trust level of the sensor data report before using it in the map information controller. The validation operation may check the authentication and confidentiality techniques used in the sensor data report. It also may compare the sensor data with historical sensor data from other sources. Another validation technique would be to compare and combine sensor data reports generated by different navigation applications for the same location trigger into a more reliable sensor data report.

Use Case—Speed Change Updates

The crowd sourced map updates can be used to keep the speed limit information always up-to-date in a map product that tries to report speed limit changes in a live manner.

Figure 7:
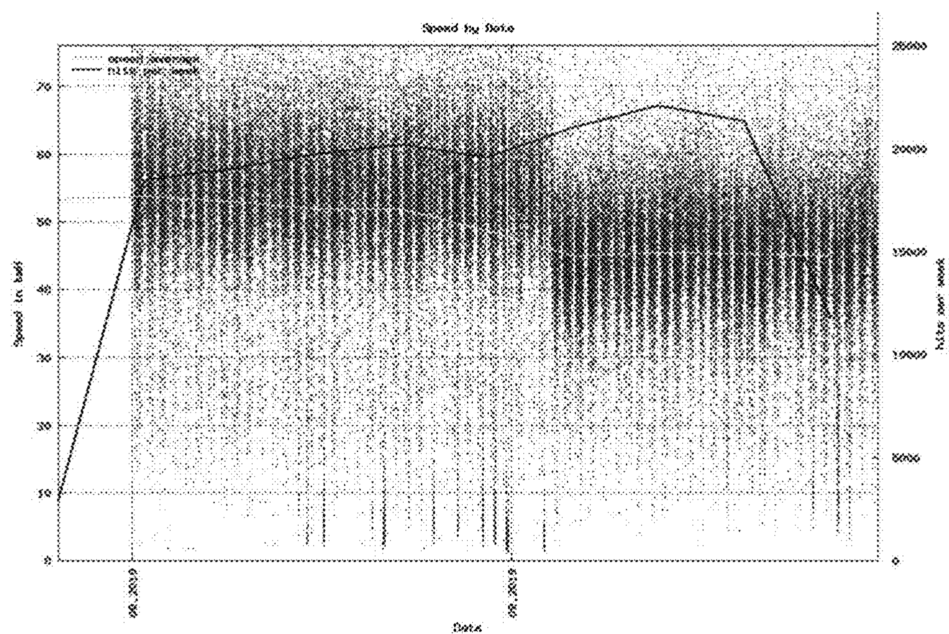
FIG. 7 shows an example of speed recordings as a function of time at a certain location within a road network.
Figure 8:
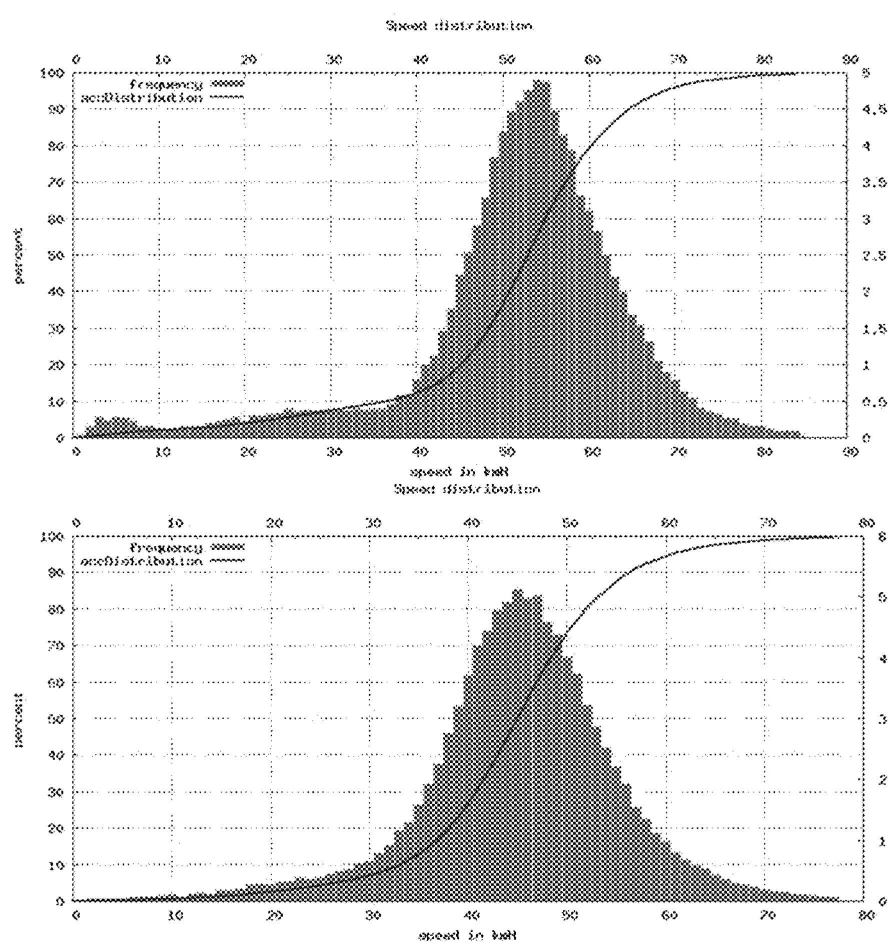
FIG. 8 shows the distribution of speed recordings for the location in the example at FIG. 7 at two different times.

In this case, there are four systems that work together to update the electronic map:

- a change detector that monitors the relevant road network and detects changes from e.g. GPS data (runs on servers in the cloud).
- an app running on a mobile platform e.g. behind the windshield
- an AI-based object detection algorithm that is running on the mobile platform
- a map service The whole road network is being monitored for changes of e.g. speeds. This can be done by measuring the speed (or other attributes) of cars when passing a road segment (illustrated in FIG. 7). Then the speed distribution of the road segment is computed over a certain duration in time (e.g. one week or one day (illustrated in FIG. 8). Then the similarity of the speed distribution is measured by e.g. using the Kullback-Leibler divergence $$D_{KL}(P\|Q) = \sum_{x \in X} P(x)\log\left(\frac{P(x)}{Q(x)}\right)$$

or any other suitable distribution similarity measure. If the similarity is below a certain threshold the segment attribute likely underwent a change and this segment is sent to the mobile platform for verification.

Figure 5:
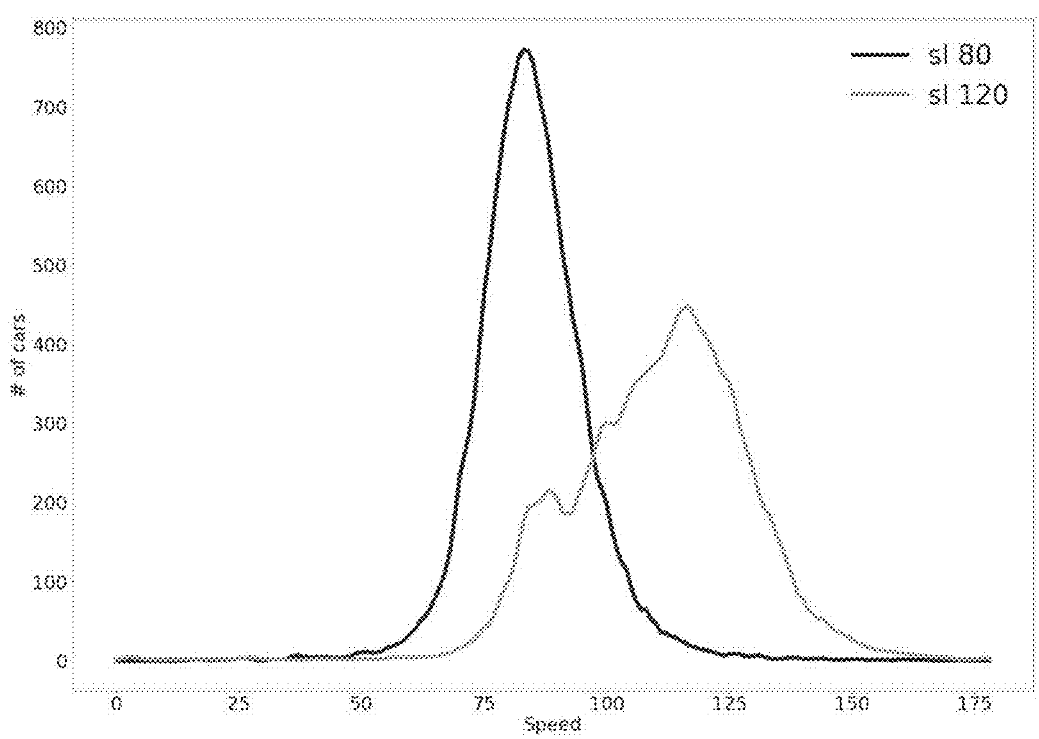
FIG. 5 shows how it may be detected from observations of probe data within a road network that a speed limit has changed.

For instance, FIG. 5 shows an example where there is a change in speed distribution between two set intervals. The change in the distribution forms the basis for issuing a request to collect data at the road segment.

Figure 6:
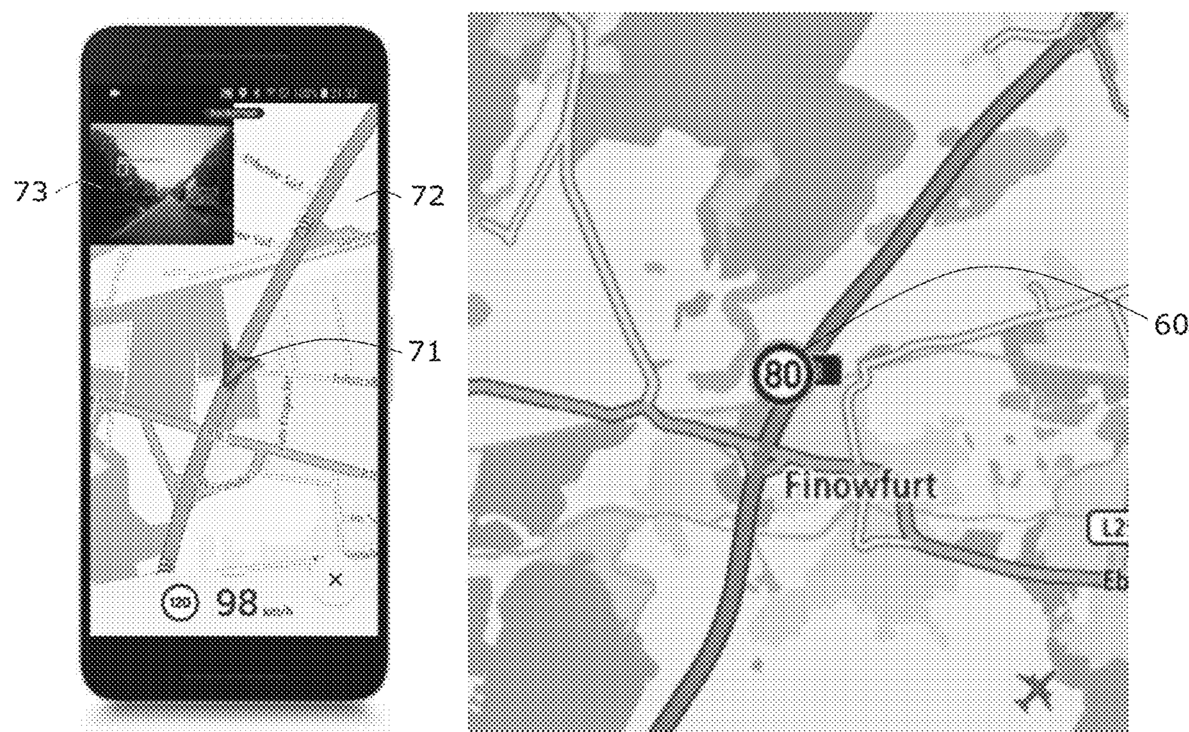
FIG. 6 shows how a location trigger may be used to confirm whether a speed limit has changed according to an embodiment.

The mobile app may run on a smartphone with the smartphone being suitable mounted such that its camera points towards the road. However, it is also contemplated that the app may run on a dedicated navigation apparatus or a navigation system in-built into the vehicle, which is provided with access to a camera of the vehicle, or indeed the smartphone camera, as part of the in-vehicle network of devices. As shown in FIG. 6, the navigation application displays road attributes such as the speed limit to engage the user based on static map content as provided by a map server. Thus, the display shows the current location 41 of the user relative to the electronic map 42, but also provides a panel display (at the bottom of the screen in FIG. 6) showing the local speed limit.

In the example shown in FIG. 6, the speed limit is shown as being 120 km/h. However, the distribution of FIG. 5 indicates that the speed limit may have changed (to 80 km/h). In this case, the mobile app receives a request to confirm the potential attribute change on a road segment. In response to this request, the mobile application automatically turns on the camera to capture an image of the speed limit sign (as indicated in the panel 73 shown in FIG. 6). Preferably, the camera is used to obtain a sequence of images (i.e. a video stream) along the road. For instance, the precise location of the speed limit sign may not be known. The camera can then be used to obtain images for the whole segment of road, knowing that the speed limit sign will be captured in at least some of these images.

The mobile app then runs a suitable object detection algorithm to process the image 73 and extract the speed limit value. This value can then be sent to the map service for updating the map and the corrected speed limit value 60 can then be displayed to the user. It will be appreciated that processing the image data on the device helps save significant bandwidth. By contrast, in some previous approaches, the whole image sequence would have been passed to a cloud server for analysis. Thus, typically, this was only done at a later time, e.g. after the end of the trip when the user is back at home and connected to their home internet connection (to avoid using too much data bandwidth). The described embodiments thus also allow the data to be reported back, and used, more regularly and/or with a lower bandwidth cost.

Other Use Case Examples

Although an example has been presented above regarding obtaining speed limit information, it will be appreciated that such location triggers may be used to obtain any desired information about a road network. For instance, some other example location triggers are listed below:

- Location trigger with a request to take a series of images at location intervals along a road segment and/or at time intervals (e.g. at a rate of one image per few seconds intervals of traffic in a road segment to estimate traffic density)
- Location trigger with a request to take images of a road junction in response to changes in junction delays
- Location trigger with a request to record accelerometer data and/or ambient noise conditions along a road segment to determine road surface conditions (e.g. for pot hole detection).
- Location trigger with a request to make a series of images at location intervals along a road segment It will also be understood that the obtained information need not be provided to a map service provider, and may find utility in a range of other applications (not limited to updating electronic maps). For example, the information may be used for traffic management, town planning, or even provided to automotive manufacturers, or other users of the road network.

Thus, it will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

Embodiments of the invention can be implemented as a computer program product for use with a computer system, the computer program product being, for example, a series of computer instructions stored on a tangible data recording medium, or embodied in a computer data signal. The series of computer instructions can constitute all or part of the functionality described above, and can also be stored in any memory device, volatile or non-volatile, such as semiconductor, magnetic, optical or other memory device.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method for obtaining information relating to a navigable network from a device travelling within the navigable network, the method comprising:

receiving, at the device, a request for obtaining sensor data, the request having:

a location-specific trigger associated with a location within the navigable network, and a script detailing sensor data that is to be obtained at the location specified in the request and detailing processing steps to be performed by the device, the script including one or more instructions that, when processed by the device, cause the device to obtain the sensor data from one or more sensors accessible by the device, process the sensor data to determine or extract information relating to one or more attributes of the navigable network, and provide a sensor data report including the information relating to the one or more attributes of the navigable network;

when the device determines that the device has reached the location associated with the trigger, automatically processing, by the device, the script to cause the device to:

obtain the sensor data from the one or more sensors; and process the sensor data to determine or extract the information relating to the one or more attributes of the navigable network, and generate the sensor data report.

2. The method of claim 1, comprising providing data indicative of the sensor data for output.

3. The method of claim 2, wherein the sensor data report includes the data indicative of the sensor data as well other information including one or more of: a time at which the sensor data was obtained; the location at which the sensor data was obtained; a device and/or sensor identifier; and a request identifier indicating the request that generated the sensor data report.

4. The method of claim 1, wherein the sensor data comprises image and/or video data captured by a camera associated with the device.

5. The method of claim 1, wherein the sensor data comprises acceleration data obtained from one or more accelerometers associated with the device.

6. The method of claim 1, wherein the device is capable of determining the device's position relative to an electronic map representing the navigable network, and wherein the device determines that the device has reached the location associated with the trigger when the device determines that the position of the device relative to the electronic map is within a predetermined threshold distance of the location.

7. The method of claim 1, wherein the trigger includes a direction indication such that sensor data is only obtained when the device determines that the device is approaching the location associated with the trigger from a selected direction.

8. The method of claim 1, wherein obtaining the sensor data from the one or more sensors includes:

causing each sensor among the one or more of the sensors to:

acquire a respective part of the sensor data; and provide, to the device, the respective part of the sensor data.

9. The method of claim 8, wherein causing at least one sensor among the one or more sensors to acquire the respective part of the sensor data includes:

configuring the at least one sensor to acquire the respective part of the sensor data.

10. The method of claim 1, wherein the instructions include some or all of:

a set of byte codes; and binary code.

11. The method of claim 1, wherein automatically processing the one or more instructions includes:

running the one or more instructions on at least one data processor for the device to cause the at least one data processor to perform operations associated with obtaining the sensor data from the one or more sensors and processing the sensor data.

12. A method for obtaining information relating to a navigable network from a device travelling within the navigable network, the method comprising:

issuing, from a server to the device, a request for obtaining sensor data, the request having:

a location-specific trigger associated with a location within the navigable network, and a script detailing sensor data that is to be obtained at the location specified in the request and detailing processing steps to be performed by the device, the script including one or more instructions that, when processed by the device, cause the device to obtain the sensor data from one or more sensors accessible by the device, process the sensor data to determine or extract information relating to one or more attributes of the navigable network, and provide a sensor data report including the information relating to the one or more attributes of the navigable network, the trigger being configured so that the device automatically processes the script when the device determines that the device has reached the location associated with the trigger; and receiving, from the device at the server, the sensor data report generated by the device in response to the request for sensor data.

13. The method of claim 12, further comprising processing, at the server, the data indicative of the sensor data, wherein the processing includes a step of validating the sensor data, wherein validating the sensor data comprises combining and/or comparing the sensor data to other sensor data obtained from at least one other device.

14. The method of claim 12, comprising updating an electronic map representing the navigable network using the data indicative of the sensor data.

15. The method of claim 12, wherein the request is issued in response to a request from the device for triggers within the vicinity of the device and/or of a predetermined route along which the device is travelling.

16. The method of claim 12, wherein the request is issued in response to detecting that there is a potential error in an electronic map representing the navigable network, the location associated with the trigger being a location at which the potential error has been detected.

17. A device that is operable to obtain information relating to a navigable network within which the device is travelling, wherein the device has access to one or more associated sensors, and wherein the device comprises one or more processors arranged to:

receive a request for obtaining sensor data, the request having:

a location-specific trigger associated with a location within the navigable network, and a script detailing sensor data that is to be obtained at the location specified in the request and detailing processing steps to be performed by the device, the script including one or more instructions that, when processed by the device, cause the device to obtain the sensor data from one or more sensors accessible by the device, process the sensor data to determine or extract information relating to one or more attributes of the navigable network, and provide a sensor data report including the information relating to the one or more attributes of the navigable network;

when the device determines that the device has reached the location associated with the trigger, automatically process the script to cause the device to:

obtain the sensor data from the one or more sensors; and process the sensor data to determine or extract the information relating to the one or more attributes of the navigable network, and generate the sensor data report.

18. A server arranged for obtaining information relating to a navigable network from a device travelling within the navigable network, the server comprising one or more processors arranged to:

issue, to the device, a request for obtaining sensor data, the request having:

a location-specific trigger associated with a location within the navigable network, and a script detailing sensor data that is to be obtained at the location specified in the request and detailing processing steps to be performed by the device, the script including one or more instructions that, when processed by the device, cause the device to obtain the sensor data from one or more sensors accessible by the device, process the sensor data to determine or extract information relating to one or more attributes of the navigable network, and provide a sensor data report including the information relating to the one or more attributes of the navigable network, the trigger being configured so that the device automatically processes the script when the device determines that the device has reached the location associated with the trigger; and receive, from the device, the sensor data report generated by the device in response to the request for sensor data.

19. A system, comprising:

a device that obtains information relating to a navigable network within which the device is travelling, the device having access to one or more associated sensors and comprising one or more processors arranged to:

receive a request for obtaining sensor data, the request having:

a location-specific trigger associated with a location within the navigable network, and a script detailing sensor data that is to be obtained at the location specified in the request and detailing processing steps to be performed by the device, the script including one or more instructions that, when processed by the device, cause the device to obtain the sensor data from one or more sensors accessible by the device, process the sensor data to determine or extract information relating to one or more attributes of the navigable network, and provide a sensor data report including the information relating to the one or more attributes of the navigable network;

when the device determines that the device has reached the location associated with the trigger, automatically process the script to cause the device to:

obtain the sensor data from the one or more sensors; and process the sensor data to determine or extract the information relating to the one or more attributes of the navigable network, and generate the sensor data report; and a server that obtains information relating to the navigable network, the server comprising one or more processors arranged to:

issue, to the device, the request for obtaining the sensor data; and receive, from the device, data indicative of the sensor data obtained by the device in response to the request for sensor data.

* * * * *